United States Patent
Berg et al.

(10) Patent No.: US 6,790,031 B2
(45) Date of Patent: Sep. 14, 2004

(54) FUEL STAGING METHODS FOR LOW NOX TANGENTIAL FIRED BOILER OPERATION

(75) Inventors: Lawrence D. Berg, Monroe, CT (US); Edmund S. Schindler, Fairfield, CT (US); Nigel John Garrad, Milford, CT (US); John Joseph Halloran, Worchester, MA (US)

(73) Assignee: RJM Corporation, Norwalk, CT (US)

( * ) Notice: Subject to any disclaimer, the term of this patent is extended or adjusted under 35 U.S.C. 154(b) by 0 days.

(21) Appl. No.: 10/346,009

(22) Filed: Jan. 16, 2003

(65) Prior Publication Data

US 2004/0142292 A1 Jul. 22, 2004

(51) Int. Cl.⁷ .............................................. F23M 3/00
(52) U.S. Cl. .......................... 431/9; 431/10; 431/165; 431/175; 110/345
(58) Field of Search ......................... 431/9, 10, 12, 431/182, 183, 184, 164, 165, 173, 174; 110/264, 262, 265, 347, 348, 344

(56) References Cited

U.S. PATENT DOCUMENTS

| | | | |
|---|---|---|---|
| 4,089,637 A | | 5/1978 | Smith et al. |
| 4,505,666 A | | 3/1985 | Martin et al. |
| 4,539,918 A | | 9/1985 | Beer et al. |
| 4,810,186 A | * | 3/1989 | Rennert et al. ............. 431/175 |
| 4,845,940 A | | 7/1989 | Beer |
| 5,315,939 A | | 5/1994 | Rini et al. |
| 5,388,536 A | | 2/1995 | Chung |
| 5,441,403 A | | 8/1995 | Tanaka et al. |
| 5,535,686 A | | 7/1996 | Chung |
| 5,622,489 A | | 4/1997 | Monro |
| 5,772,421 A | | 6/1998 | Besik et al. |
| 5,799,594 A | | 9/1998 | Dernjatin et al. |
| 5,879,148 A | | 3/1999 | Cheng et al. |
| 6,089,855 A | | 7/2000 | Becker et al. |
| 6,120,281 A | * | 9/2000 | Vatsky ............................ 431/9 |
| 6,325,002 B1 | * | 12/2001 | Ashworth ..................... 110/345 |
| 6,419,480 B2 | | 7/2002 | Al-Halbouni |
| 6,425,755 B1 | | 7/2002 | Pillard et al. |
| 2003/0091948 A1 | * | 5/2003 | Bool et al. ..................... 431/10 |

* cited by examiner

Primary Examiner—James C. Yeung
(74) Attorney, Agent, or Firm—St. Onge Steward Johnston & Reens LLC (57) ABSTRACT

A tangential fired boiler has a circumferential wall defining a combustion zone and a plurality of fuel inlets disposed along the circumferential wall. The plurality of fuel inlets inject fuel at non-uniform rates in order to produce localized fuel rich, oxygen poor zones and fuel lean, oxygen rich zones within the combustion zone, and to cause ambient boiler gases to be entrained into and mix with the oxygen poor zone to achieve fuel staging of the boiler.

30 Claims, 9 Drawing Sheets

Figure 1

(PRIOR ART)

(PRIOR ART)

(PRIOR ART)

Figure 5B

(PRIOR ART)

FUEL STAGING METHODS FOR LOW NOX TANGENTIAL FIRED BOILER OPERATION

FIELD OF THE INVENTION

The present invention relates generally to a tangential fired boiler, and more particularly to a tangential fired boiler which produces reduced levels of pollution components from a combustion process as compared to traditional tangential fired boilers.

BACKGROUND OF THE INVENTION

As is well-known, the combustion of fossil fuels (i.e., coal, natural gas, oil) in boilers, furnaces and the like leads to the creation of various pollution components. One of such pollution components is NOx (the various combinations of nitrogen and oxygen, primarily NO and $NO_2$), a pollutant that leads to smog and acid rain, especially in urban environments. Generally, the nitrogen for the formation of NOx comes from air that is introduced into the boiler for combustion, as air consists of approximately 21% oxygen and 79% nitrogen, or from the fuel itself when certain fuels are used. Therefore, when oxygen is burned in a boiler, nitrogen is always present.

At high temperatures the nitrogen will combine with the oxygen to form NOx. Moreover, as the temperatures within the boiler increase, the formation of NOx also increases. At approximately 2200° F. NOx begins to form. As the temperature in the boiler increases beyond this temperature, the formation of NOx increases rapidly. At temperatures over approximately 2780° F. the formation of NOx generally doubles for each increase of about 190° F. This is referred to as thermal NOx. Another type of NOx is known as fuel NOx, in which fuel-bound nitrogen (FBN) is the major source of NOx emissions from combustion of nitrogen-bearing fuels such as heavy oils, coal, and coke. Under the reducing conditions surrounding the burning droplet or particle, the FBN is converted to fixed nitrogen species such as HCN and $NH_3$. These, in turn, are readily oxidized to form NOx if they reach the lean zone of the flame. Under the proper conditions, however, it has been found that these fixed nitrogen species may be converted to molecular nitrogen, thus avoiding the NOx formation path Systems and methods for reducing various pollution components, such as NOx, produced during combustion processes are known. One example of such a NOx control process is catalytic reduction, in which the relatively cool combustion effluent of several hundred degrees Fahrenheit is passed over a catalyst coated bed in the presence of ammonia. This process is called selective catalytic reduction (SCR). However, while SCR is relatively effective at reducing NOx emissions (it can reduce NOx by more than 90% in some instances), it is a relatively complex process which is relatively expensive both to implement and operate. Moreover, the more NOx that is present in the combustion effluent, the higher the operating costs for NOx neutralizing processes such as SCR (caused by increased ammonia consumption and decreased catalyst life). Thus, even if a NOx neutralizing process is employed, it would still be desirable to reduce the amount of NOx produced during the combustion step itself.

To date, much of the effort to reduce NOx created during combustion has focused on the design and operation of individual burners themselves. For example, U.S. Pat. No. 4,539,918 discloses a multi-annular swirl burner which includes a plurality of overlapping tubular wall members which form a rich combustion zone and a lean combustion zone with a throat section therebetween. Other references, such as U.S. Pat. No. 4,505,666, relate to burners which employ fuel staging to reduce the amount of NOx produced by the burners. These arrangements are designed to reduce the amount of NOx produced by the burner. However, reducing the amount of NOx produced by individual burners may not provide sufficient NOx reduction when a plurality of such burners are arranged together in a tangential fired boiler. This is true because while the temperature profile in each individual burner may be conducive to producing low NOx, when a plurality of burners are fired together in the boiler, the temperature profile in the boiler may be such that relatively high levels of NOx are produced. Moreover, even though the burners themselves may achieve fuel staging on an individual level, no known systems achieve fuel staging on the furnace level.

U.S. Pat. No. 5,315,939 does disclose an integrated low NOx tangential firing system that is claimed to be particularly suited for use with pulverized solid fuel-fired furnaces, and a method of operating a pulverized solid fuel-fired furnace equipped with an integrated low NOx tangential firing system. However, the system disclosed therein relies solely upon directional control of the fuel and/or air source. This is disadvantageous in that such systems may be difficult and/or expensive to install and may not provide adequate NOx reduction.

What is desired, therefore, is a tangential fired boiler which produces relatively low levels of NOx, which produces a relatively low level of NOx during combustion in addition to or instead of neutralizing the NOx produced during combustion, which maintains a temperature profile therewithin that is conducive to producing relatively low levels of NOx, which does not rely solely upon directional control of the fuel and/or air source in order to produce relatively low levels of NOx, which employs fuel staging on the boiler level rather than merely on the burner level, and which is relatively simple and inexpensive to install and operate.

SUMMARY OF THE INVENTION

Accordingly, it is an object of the present invention to provide a tangential fired boiler which produces relatively low levels of NOx.

Another object of the present invention is to provide a tangential fired boiler having the above characteristics and which produces a relatively low level of NOx during combustion in addition to or instead of neutralizing the NOx produced during combustion.

A further object of the present invention is to provide a tangential fired boiler having the above characteristics and which maintains a temperature profile therewithin that is conducive to producing relatively low levels of NOx.

Still another object of the present invention is to provide a tangential fired boiler having the above characteristics and which does not rely solely upon directional control of the fuel and/or air source in order to produce relatively low levels of NOx.

Yet another object of the present invention is to provide a tangential fired boiler having the above characteristics and which employs fuel staging on the boiler level rather than merely on the burner level.

Yet a further object of the present invention is to provide a tangential fired boiler having the above characteristics and which is relatively simple and inexpensive to install and operate.

These and other objects of the present invention are achieved by provision of a tangential fired boiler having a circumferential wall defining a combustion zone and a plurality of fuel inlets disposed along the circumferential wall. The plurality of fuel inlets inject fuel at non-uniform rates in order to produce localized fuel rich, oxygen poor zones and fuel lean, oxygen rich zones within the combustion zone so as to promote fuel staging throughout the boiler. The fuel may comprise, for example, natural gas. The fuel inlets may be constant rate fuel inlets, variable rate fuel inlets or a combination of both.

In one embodiment, the plurality of fuel inlets are arranged substantially vertically along the circumferential wall. Preferably, the plurality of fuel inlets are arranged such that an uppermost fuel inlet injects fuel at a lowest rate, a lowermost fuel inlet injects fuel at a highest rate, and fuel inlets located between the uppermost and lowermost fuel inlets inject fuel at intermediate rates along a gradient such that a localized fuel rich, oxygen poor zone is created toward a bottom of the combustion zone and a fuel lean, oxygen rich zone is created toward a top of the combustion zone. Fuel is mixed with ambient furnace gases in the oxygen poor zone, thus effecting fuel staging. At least one overfire air inlet disposed vertically above the uppermost fuel inlet may optionally be provided. Thus, this embodiment achieves a vertical fuel staged furnace.

In another embodiment, the circumferential wall defining the combustion zone is generally rectangular when viewed along a generally horizontal cross-section. A first set of the plurality of fuel inlets are disposed in two diagonally opposed corners of the circumferential wall and a second set of the plurality of fuel inlets are disposed in the other two of the diagonally opposed corners of the circumferential wall. The first set of fuel inlets inject fuel at a higher rate than the second set of fuel inlets. Localized fuel rich, oxygen poor zones are created toward the first set of fuel inlets, while fuel lean, oxygen rich zones are created toward the second set of fuel inlets. Fuel is mixed with ambient furnace gases in the oxygen poor zones, thus effecting fuel staging. Thus, this embodiment achieves a tangential fuel staged furnace.

In another embodiment in which the circumferential wall defining the combustion zone is generally rectangular when viewed along a generally horizontal cross-section, the combustion zone has a fireball disposed therein fed by fuel injected by the plurality of fuel inlets, the fireball rotating about an imaginary axis when viewed along a generally horizontal cross-section. A set of the plurality of fuel inlets is disposed in each of the corners of the circumferential wall, the fuel inlets comprising each set of the plurality of fuel inlets injecting fuel at non-uniform rates. Most preferably, the fuel inlets comprising each set of the plurality of fuel inlets are spaced apart horizontally, and the fuel inlets comprising each set of the plurality of fuel inlets are arranged such that a fuel inlet located most upstream with respect to rotation of the fireball injects fuel at a highest rate, a fuel inlet located most downstream with respect to rotation of the fireball injects fuel at a lowest rate, and fuel inlets located between the most upstream and most downstream fuel inlets inject fuel at intermediate rates along a gradient such that a localized fuel rich, oxygen poor zone is created toward a center of the combustion zone and a fuel lean, oxygen rich zone is created toward a periphery of the combustion zone. Fuel is mixed with ambient furnace gases in the oxygen poor zone, thus effecting fuel staging. Thus, this embodiment achieves a radial fuel staged furnace.

The invention and its particular features and advantages will become more apparent from the following detailed description considered with reference to the accompanying drawings.

DETAILED DESCRIPTION OF EMBODIMENTS OF THE INVENTION

Figure 1:
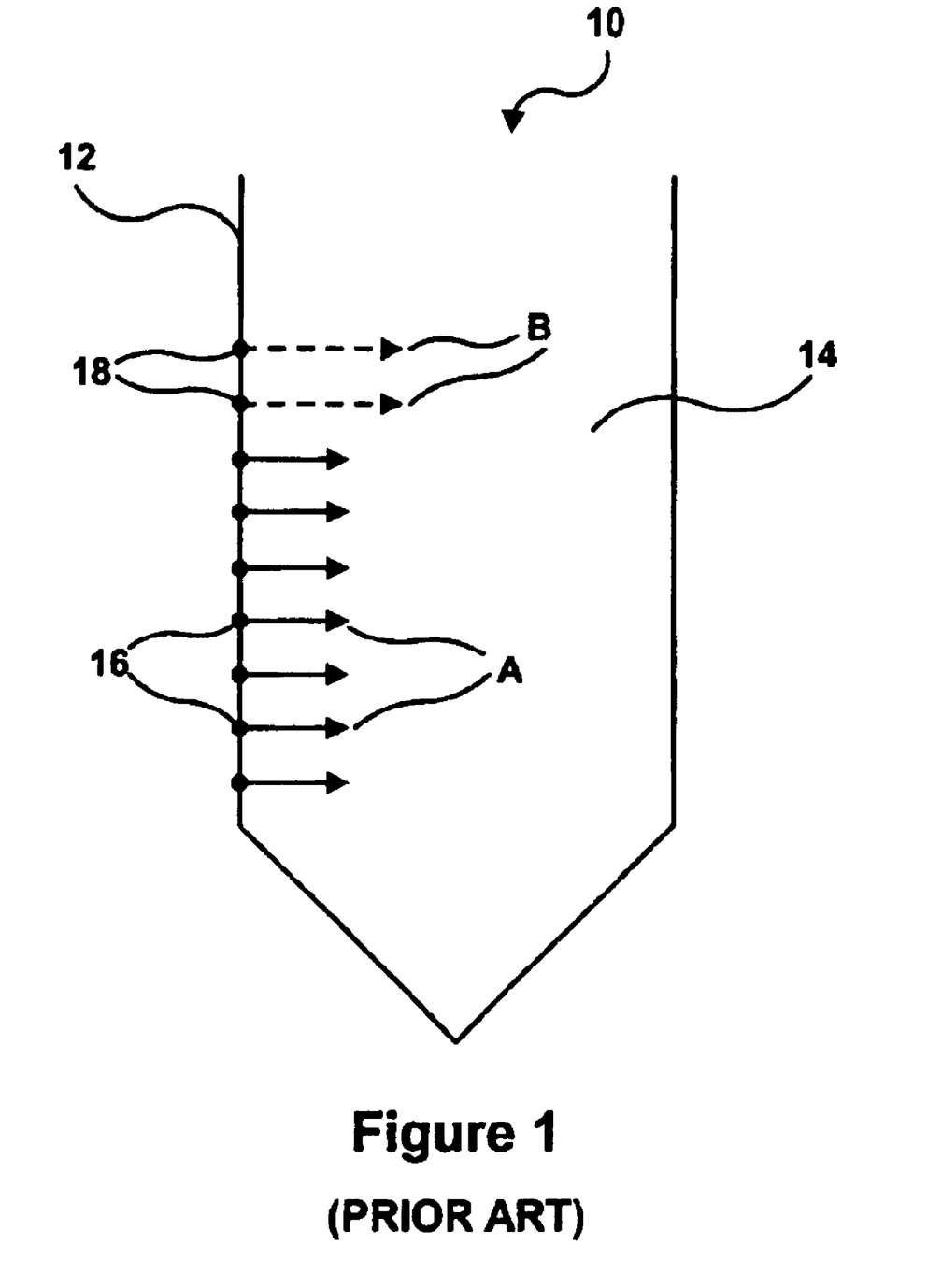
FIG. 1 is a schematic side view of a tangential fired boiler in accordance with the prior art.

Referring first to FIG. 1, a tangential fired boiler 10 in accordance with a known prior art design is shown. Tangential fired boiler 10 includes a circumferential wall 12 defining a combustion zone 14 and a plurality of fuel inlets 16 disposed substantially vertically along circumferential wall 12. Fuel is injected (indicated by arrows A) at a uniform rate through each of fuel inlets 16. This leads to a generally uniform fuel/oxygen distribution within combustion zone 14, which in turn creates a relatively large area in which fuel is rapidly burned and in which NOx is rapidly created.

Tangential fired boiler 10 may optionally be provided with an overfire air system to divert secondary air above the top fuel inlet rows. Such a system is designed to inject air through air inlets 18 at the proper velocity (indicated by dashed arrows B) to complete combustion prior to the boiler exit. Although the overfire air injected through air inlets 18 may not be uniform with air being injected lower in the boiler, in known tangential fired boiler 10, the rate at which fuel is injected through each fuel inlet 16 is uniform.

Figure 2A:
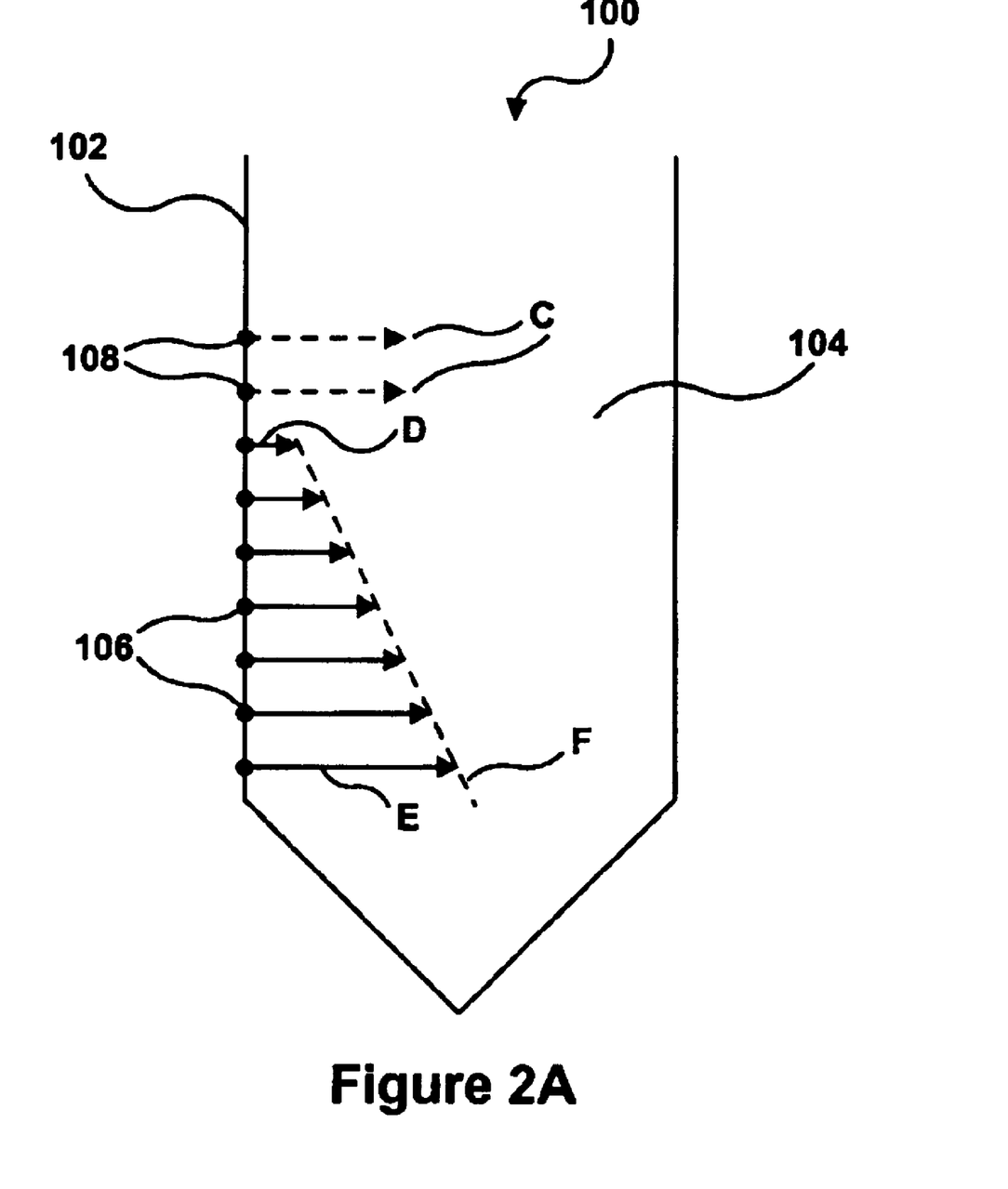
FIGS. 2A and 2B are schematic side views of a tangential fired boiler in accordance with two embodiments of the present invention.
Figure 2B:
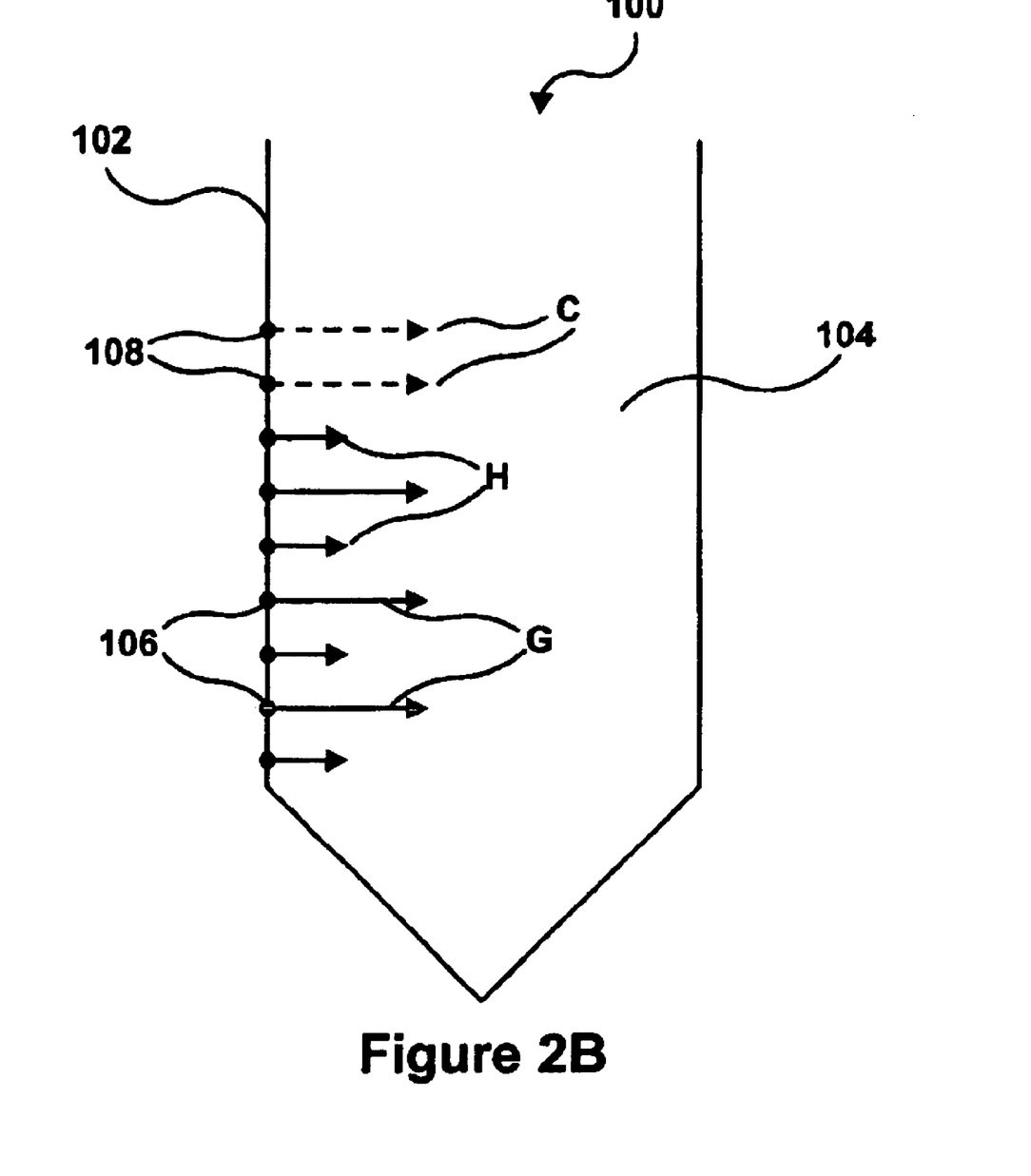

Referring now to FIGS. 2A and 2B, a tangential fired boiler 100 in accordance with a first embodiment of the present invention is shown. Like known tangential fired boiler 10, tangential fired boiler 100 includes a circumferential wall 102 defining a combustion zone 104 and a plurality of fuel inlets 106 disposed substantially vertically along circumferential wall 102. However, unlike known tangential fired boiler, in tangential fired boiler 100, fuel is injected at a non-uniform rate through fuel inlets 106.

When the term "non-uniform rate" is used herein, what is meant is that the rate at which fuel is injected is not identical for every fuel inlet. It should be noted, however, that is possible for the rate at which fuel is injected through two or more fuel inlets to be identical. All that is required by "non-uniform rate" is that the rate at which fuel is injected through at least one fuel inlet be substantially different that the rate at which fuel is injected through at least one other fuel inlet.

Because fuel is injected at a non-uniform rate through fuel inlets 106, localized fuel rich, oxygen poor zones and fuel lean, oxygen rich zones may be created within the combustion zone. This causes the fuel to be burned more slowly, which leads to less NOx being created. Fuel is mixed with ambient furnace gases in the oxygen poor zone, thus effecting fuel staging. Because of the specific configuration of the boiler and the locations of the fuel inlets, this embodiment achieves a vertical fuel staged furnace.

Although the fuel injected into tangential fired boiler 100 may comprise any of numerous known fuels, it has been found that tangential fired boiler 100 is particularly well suited for use with natural gas. It should also be noted that fuel inlets 106 may be constant rate fuel inlets, may by variable rate fuel inlets or may be a combination of both, as is known in the art. Like tangential fired boiler 10, tangential fired boiler 100 may optionally be provided with an overfire air system to divert secondary air (indicated by dashed arrows C) above the top fuel inlet 106 rows.

Referring now specifically to FIG. 2A, the plurality of fuel inlets 106 may be arranged such that an uppermost fuel inlet injects fuel at a lowest rate (indicated by arrow D), a lowermost fuel inlet injects fuel at a highest rate (indicated by arrow E), and fuel inlets located between the uppermost and lowermost fuel inlets inject fuel at intermediate rates along a gradient (indicated by dashed line F). Employing this arrangement causes a localized fuel rich, oxygen poor zone to be created toward a bottom of combustion zone 104 and a fuel lean, oxygen rich zone to be created toward a top of combustion zone 104.

Of course, other configurations for the rates at which fuel is injected through fuel inlets 106 are also possible. Referring to FIG. 2B, for example, the rates at which fuel is introduced through fuel inlets 106 may simply be staggered between those through which fuel is introduced at a higher rate (indicated by arrows G) and those through which fuel is introduced at a lower rate (indicated by arrows H). Employing this arrangement would cause a plurality of localized fuel rich, oxygen poor zones to be created within combustion zone 104 adjacent to the fuel inlets 106 through which fuel is introduced at a higher rate (indicated by arrows G) and a plurality of fuel lean, oxygen rich zones to be created therebetween.

Figure 3:
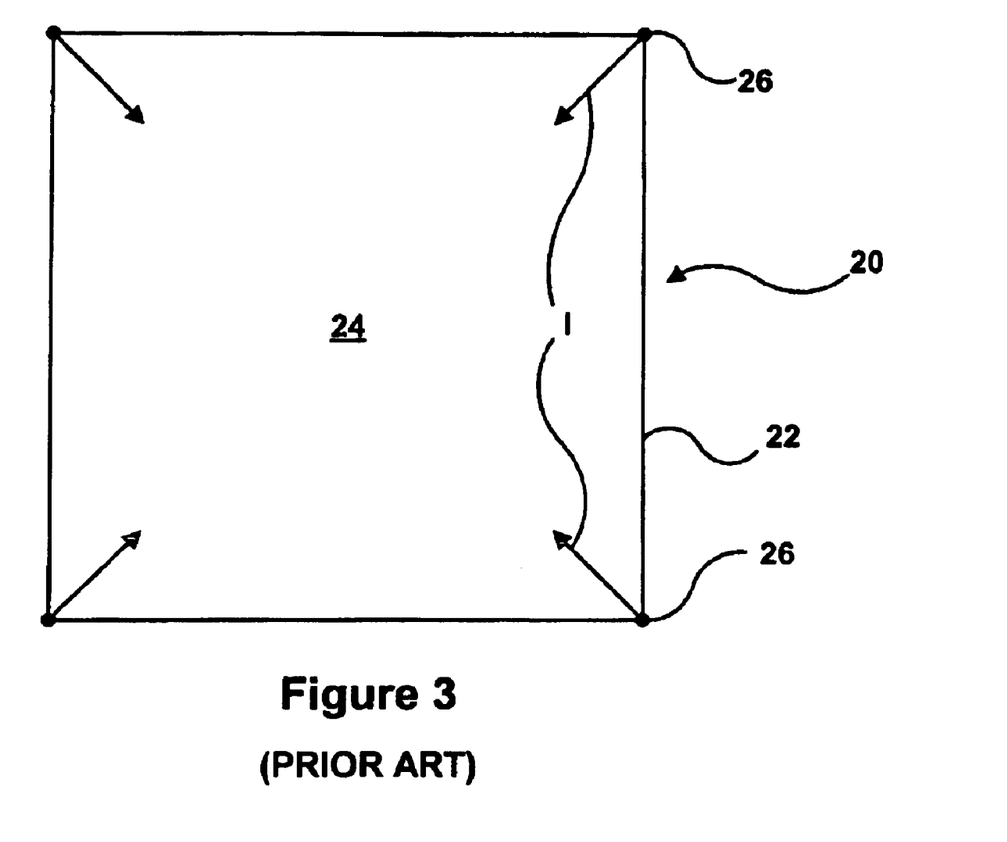
FIG. 3 is a schematic top view of a tangential fired boiler in accordance with the prior art.

Referring now to FIG. 3, another tangential fired boiler 20 in accordance with a known prior art design is shown. Tangential fired boiler 20 includes a circumferential wall 22 defining a combustion zone 24 and a plurality of fuel inlets 26. Combustion zone 24 is generally rectangular when viewed along a generally horizontal cross-section. The plurality of fuel inlets 26 are disposed within the four corners of combustion zone 24. Fuel is injected (indicated by arrows I) at a uniform rate through each of fuel inlets 26. This leads to a generally uniform fuel/oxygen distribution within combustion zone 24, which in turn creates a relatively large area in which fuel is rapidly burned and in which NOx is rapidly created.

Figure 4:
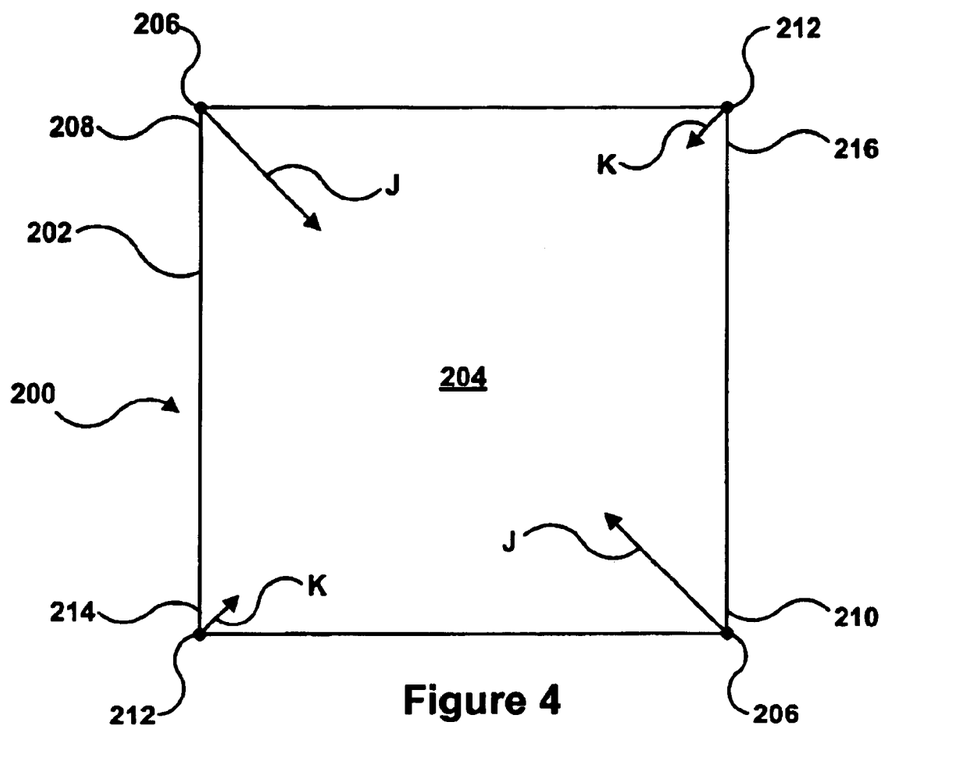
FIG. 4 is a schematic top view of a tangential fired boiler in accordance with another embodiment of the present invention.

In another embodiment of the present invention, shown in FIG. 4, a tangential fired boiler 200 includes a circumferential wall 202 defining a combustion zone 204. Combustion zone 204 is generally rectangular when viewed along a generally horizontal cross-section. A first set 206 of fuel inlets are disposed in two diagonally opposed corners 208, 210 of circumferential wall 202 and a second set 212 of fuel inlets are disposed in the other two 214, 216 of the diagonally opposed corners of circumferential wall 202. The first set 206 of fuel inlets inject fuel (indicated by arrows J) at a higher rate than the second set 212 of fuel inlets (indicated by arrows K). Localized fuel rich, oxygen poor zones are created toward the first set of fuel inlets, while fuel lean, oxygen rich zones are created toward the second set of fuel inlets. Fuel is mixed with ambient furnace gases in the oxygen poor zones, thus effecting fuel staging. Because of the specific configuration of the boiler and the locations of the fuel inlets, this embodiment achieves a tangential fuel staged furnace.

Figure 5A:
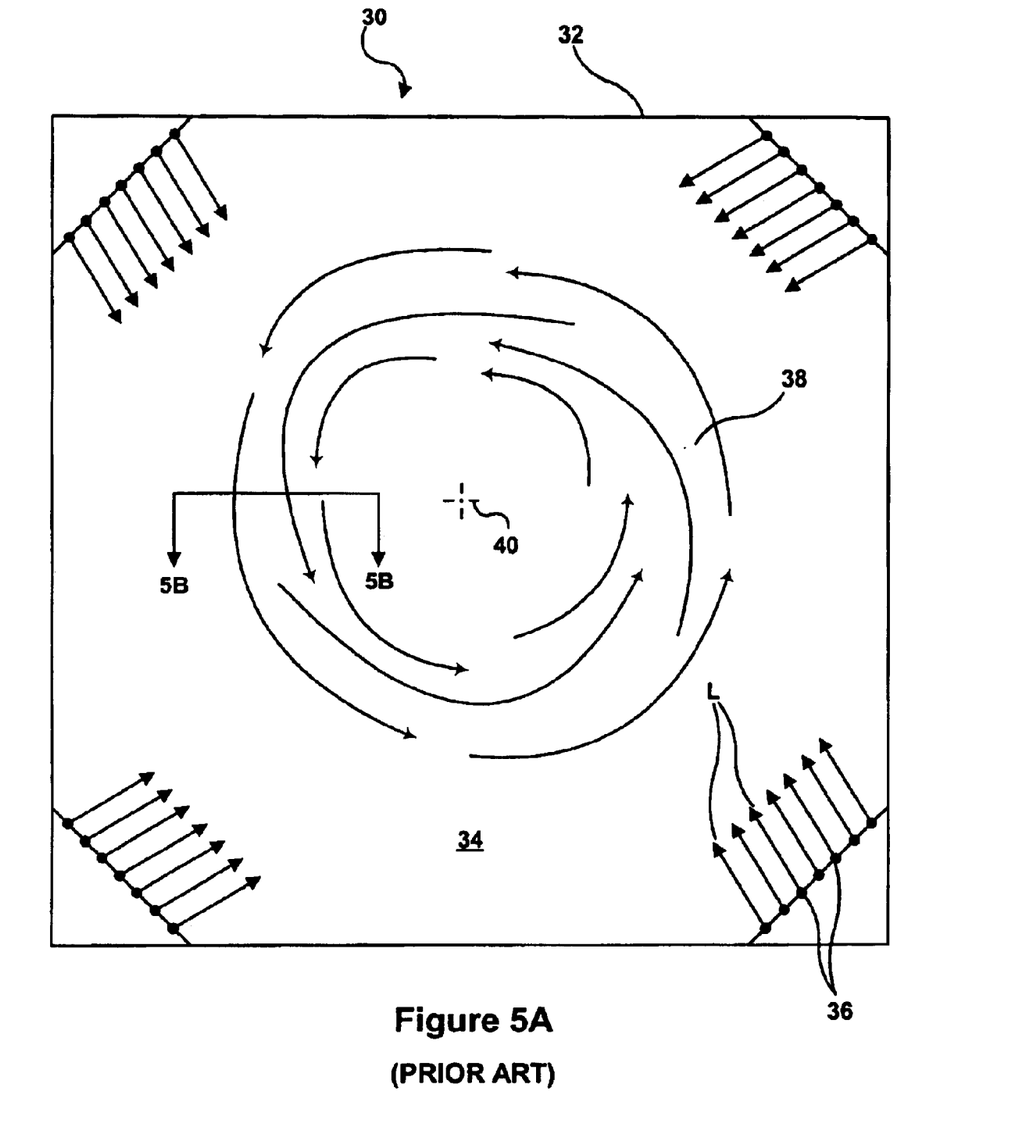
FIG. 5A is a schematic top view of a tangential fired boiler in accordance with the prior art.

Referring now to FIG. 5A, yet another tangential fired boiler 30 in accordance with a known prior art design is shown. Tangential fired boiler 30 includes a circumferential wall 32 defining a combustion zone 34 and a plurality of fuel inlets 36. Combustion zone 34 is generally rectangular when viewed along a generally horizontal cross-section. Combustion zone 34 has a fireball 38 disposed therein fed by fuel injected by the plurality of fuel inlets 36, the fireball 38 rotating about an imaginary axis 40 when viewed along a generally horizontal cross-section.

Figure 5B:
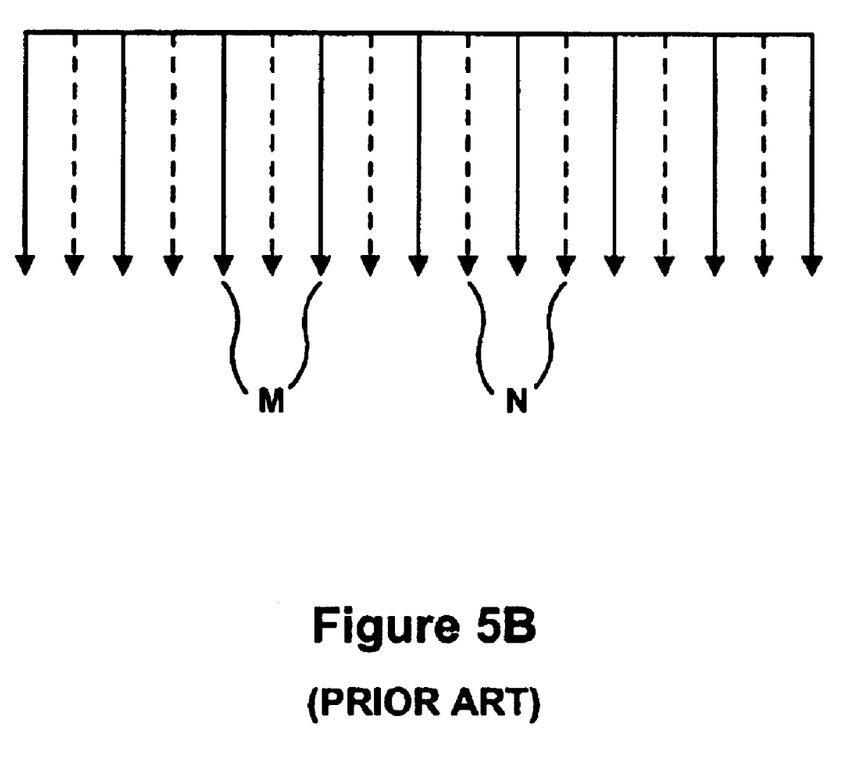
FIG. 5B is a schematic sectional view illustrating the fuel and air distribution of the prior art tangential fired boiler taken along line 5B—5B of FIG. 5A.

A set of the plurality of fuel inlets 36 is disposed in each of the corners of the circumferential wall 32. Fuel is injected (indicated by arrows L) at a uniform rate through each of fuel inlets 36 comprising each set of fuel inlets. This leads to a generally uniform fuel/oxygen distribution within combustion zone 34, and more particularly within the fireball 38. This is illustrated in more detail in FIG. 5B. which shows the generally uniform distribution of fuel (indicated by solid arrows M) and oxygen (indicated by dashed arrows N). This relatively uniform fuel/oxygen distribution in turn creates a relatively large area within combustion zone 34 in which fuel is rapidly burned and In which NOx is rapidly created.

Figure 6A:
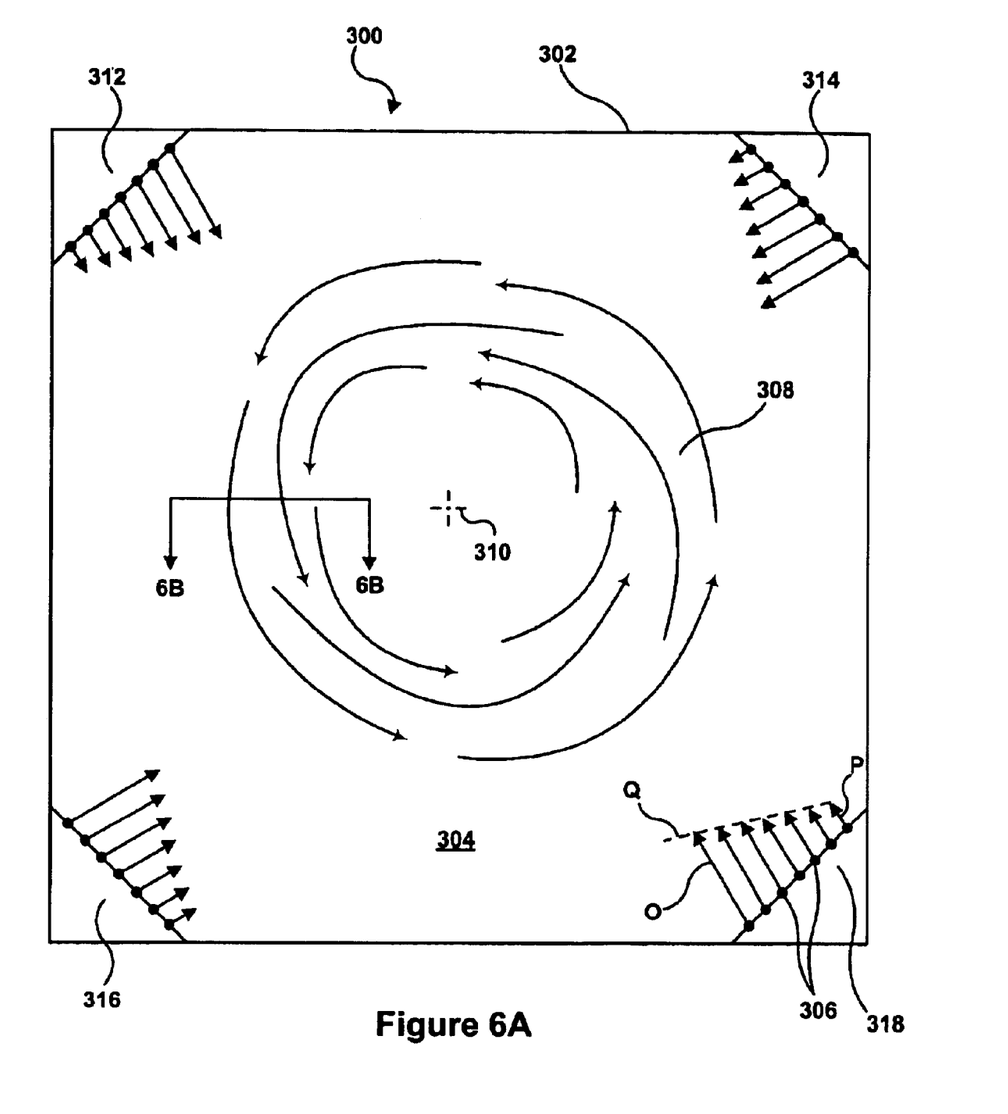
FIG. 6A is a schematic top view of a tangential fired boiler in accordance another embodiment of the present invention.

Referring now to FIG. 6A, another embodiment of a tangential fired boiler 300 in accordance with the present invention is shown. Tangential fired boiler 300 includes a circumferential wall 302 defining a combustion zone 304 and a plurality of fuel inlets 306. Combustion zone 304 is generally rectangular when viewed along a generally horizontal cross-section. Combustion zone 304 has a fireball 308 disposed therein fed by fuel injected by the plurality of fuel inlets 306, the fireball 308 rotating about an imaginary axis 310 when viewed along a generally horizontal cross-section.

Figure 6B:
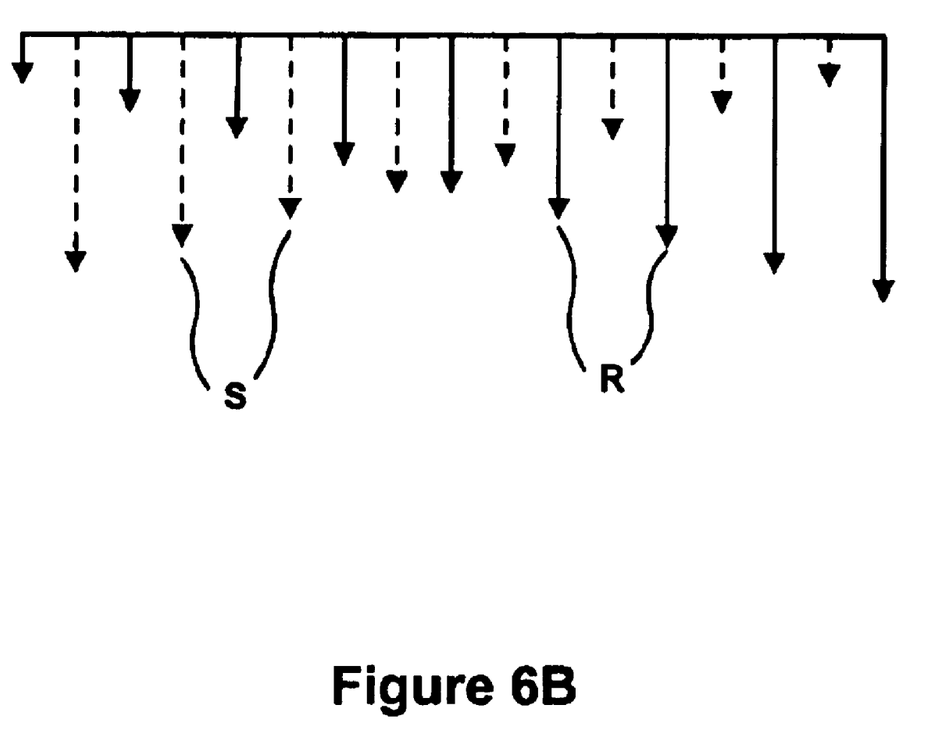
FIG. 6B is a schematic sectional view illustrating the fuel and air distribution of the tangential fired boiler taken along line 6B—6B of FIG. 6A.

A set 312, 314, 316, 318 of the plurality of fuel inlets 306 is disposed in each of the corners of the circumferential wall. The fuel inlets comprising each set 312, 314, 316, 318 inject fuel at non-uniform rates. More specifically, the fuel inlets comprising each set 312, 314, 316, 318 are spaced apart horizontally, and the fuel inlets comprising each set 312, 314, 316, 318 are arranged such that a fuel inlet located most upstream with respect to rotation of the fireball 308 injects fuel at a highest rate (indicated by arrow O), a fuel inlet located most downstream with respect to rotation of the fireball 308 injects fuel at a lowest rate (indicated by arrow P), and fuel inlets located between the most upstream and most downstream fuel inlets inject fuel at intermediate rates along a gradient (indicated by dashed line Q) such that a localized fuel rich, oxygen poor zone is created toward a center of the combustion zone 304 and a fuel lean, oxygen rich zone is created toward a periphery of the combustion zone 304. This is illustrated in more detail in FIG. 6B, which shows the generally non-uniform distribution of fuel (indicated by solid arrows R) and oxygen (indicated by dashed arrows S). Fuel is mixed with ambient furnace gases in the oxygen poor zone, thus effecting fuel staging. Because of the specific configuration of the boiler and the locations of the fuel inlets, this embodiment achieves a radial fuel staged furnace.

The present invention, therefore, provides a tangential fired boiler which produces relatively low levels of NOx, which produces a relatively low level of NOx during combustion in addition to or instead of neutralizing the NOx produced during combustion, which maintains a temperature profile therewithin that is conducive to producing relatively low levels of NOx, which does not rely solely upon directional control of the fuel and/or air source in order to produce relatively low levels of NOx, and which is relatively simple and inexpensive to install and operate.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A tangential fired boiler comprising:
   a circumferential wall defining a combustion zone;
   a plurality of fuel inlets disposed along said circumferential wall, said plurality of fuel inlets injecting fuel at non-uniform rates in order to produce localized fuel rich, oxygen poor zones and fuel lean, oxygen rich zones within the combustion zone, and to cause ambient boiler gases to be entrained into and mix with the oxygen poor zones to achieve fuel staging of the boiler;
   wherein said plurality of fuel inlets are arranged substantially vertically along said circumferential wall; and
   wherein said plurality of fuel inlets are arranged such that an uppermost fuel inlet injects fuel at a lowest rate, a lowermost fuel inlet injects fuel at a highest rate, and fuel inlets located between the uppermost and lowermost fuel inlets inject fuel at intermediate rates along a gradient such that a localized fuel rich, oxygen poor zone is created toward a bottom of the combustion zone and a fuel lean, oxygen rich zone is created toward a top of the combustion zone.

2. The tangential fired boiler of claim 1 wherein the fuel comprises natural gas.

3. The tangential fired boiler of claim 1 wherein said plurality of fuel inlets are constant rate fuel inlets.

4. The tangential fired boiler of claim 1 wherein said plurality of fuel inlets are variable rate fuel inlets.

5. The tangential fired boiler of claim 1 further comprising at least one overfire air inlet disposed vertically above the uppermost fuel inlet.

6. The tangential fired boiler of claim 1 wherein said circumferential wall defining the combustion zone is generally rectangular when viewed along a generally horizontal cross-section.

7. A tangential fired boiler comprising:
   a circumferential wall defining a combustion zone;
   a plurality of fuel inlets disposed along said circumferential wall, said plurality of fuel inlets injecting fuel at non-uniform rates in order to produce localized fuel rich, oxygen poor zones and fuel lean, oxygen rich zones within the combustion zone, and to cause ambient boiler gases to be entrained into and mix with the oxygen poor zones to achieve fuel staging of the boiler;
   wherein said circumferential wall defining the combustion zone is generally rectangular when viewed along a generally horizontal cross-section;
   wherein a first set of said plurality of fuel inlets are disposed in two diagonally opposed corners of said circumferential wall;
   wherein a second set of said plurality of fuel inlets are disposed in the other two of the diagonally opposed corners of said circumferential wall; and
   wherein the first set of fuel inlets inject fuel at a higher rate than the second set of fuel inlets.

8. A tangential fired boiler comprising:
   a circumferential wall defining a combustion zone;
   a plurality of fuel inlets disposed along said circumferential wall, said plurality of fuel inlets injecting fuel at non-uniform rates in order to produce localized fuel rich, oxygen poor zones and fuel lean, oxygen rich zones within the combustion zone, and to cause ambient boiler gases to be entrained into and mix with the oxygen poor zones to achieve fuel staging of the boiler;
   wherein said circumferential wall defining the combustion zone is generally rectangular when viewed along a generally horizontal cross-section;
   wherein the combustion zone has a fireball disposed therein fed by fuel injected by said plurality of fuel inlets, the fireball rotating about an imaginary axis when viewed along a generally horizontal cross-section;
   wherein a set of said plurality of fuel inlets is disposed in each of the corners of said circumferential wall; and
   wherein the fuel inlets comprising each set of said plurality of fuel inlets inject fuel at non-uniform rates.

9. The tangential fired boiler of claim 8:
   wherein the fuel inlets comprising each set of said plurality of fuel inlets are spaced apart horizontally; and
   wherein the fuel inlets comprising each set of said plurality of fuel inlets are arranged such that a fuel inlet located most upstream with respect to rotation of the fireball injects fuel at a highest rate, a fuel inlet located most downstream with respect to rotation of the fireball injects fuel at a lowest rate, and fuel inlets located between the most upstream and most downstream fuel inlets inject fuel at intermediate rates along a gradient such that a localized fuel rich, oxygen poor zone is created toward a center of the combustion zone and a fuel lean, oxygen rich zone is created toward a periphery of the combustion zone.

10. A tangential fired boiler comprising:
    a circumferential wall defining a combustion zone; and
    a plurality of fuel inlets disposed substantially vertically along said circumferential wall, such that an uppermost fuel inlet injects fuel at a lowest rate, a lowermost fuel inlet injects fuel at a highest rate, and fuel inlets located between the uppermost and lowermost fuel inlets inject fuel at intermediate rates along a gradient such that a localized fuel rich, oxygen poor zone is created toward a bottom of the combustion zone and a fuel lean, oxygen rich zone is created toward a top of the combustion zone, and to cause ambient boiler gases to be entrained into and mix with the oxygen poor zone to achieve fuel staging of the boiler.

11. The tangential fired boiler of claim 10 wherein the fuel comprises natural gas.

12. The tangential fired boiler of claim 10 wherein said plurality of fuel inlets are constant rate fuel inlets.

13. The tangential fired boiler of claim 10 wherein said plurality of fuel inlets are variable rate fuel inlets.

14. The tangential fired boiler of claim 10 further comprising at least one overfire air inlet disposed vertically above the uppermost fuel inlet.

15. A tangential fired boiler comprising:
    a circumferential wall defining a combustion zone, said circumferential wall being generally rectangular when viewed along a generally horizontal cross-section;

a plurality of fuel inlets disposed along said circumferential wall, said plurality of fuel inlets comprising a first set of fuel inlets disposed in two diagonally opposed corners of said circumferential wall and a second set of fuel inlets disposed in the other two of the diagonally opposed corners of said circumferential wall; and wherein the first set of fuel inlets inject fuel at a higher rate than the second set of fuel inlets.

16. The tangential fired boiler of claim 15 wherein the fuel comprises natural gas.

17. The tangential fired boiler of claim 15 wherein said plurality of fuel inlets are constant rate fuel inlets.

18. The tangential fired boiler of claim 15 wherein said plurality of fuel inlets are variable rate fuel inlets.

19. A tangential fired boiler comprising:

a circumferential wall defining a combustion zone, said circumferential wall being generally rectangular when viewed along a generally horizontal cross-section and having a fireball disposed therein, the fireball rotating about an imaginary axis when viewed along a generally horizontal cross-section;

a plurality of fuel inlets disposed along said circumferential wall, said plurality of fuel inlets comprising a set of fuel inlets disposed in each of the corners of said circumferential wall; and wherein the fuel inlets comprising each set of said plurality of fuel inlets inject fuel at non-uniform rates;

wherein the fuel inlets comprising each set of said plurality of fuel inlets are spaced apart horizontally; and wherein the fuel inlets comprising each set of said plurality of fuel inlets are arranged such that a fuel inlet located most upstream with respect to rotation of the fireball injects fuel at a highest rate, a fuel inlet located most downstream with respect to rotation of the fireball injects fuel at a lowest rate, and fuel inlets located between the most upstream and most downstream fuel inlets inject fuel at intermediate rates along a gradient such that a localized fuel rich, oxygen poor zone is created toward a center of the combustion zone and a fuel lean, oxygen rich zone is created toward a periphery of the combustion zone, and such that ambient boiler gases are caused to be entrained into and mix with the oxygen poor zone to achieve fuel staging of the boiler.

20. The tangential fired boiler of claim 19 wherein the fuel comprises natural gas.

21. The tangential fired boiler of claim 19 wherein said plurality of fuel inlets are constant rate fuel inlets.

22. The tangential fired boiler of claim 19 wherein said plurality of fuel inlets are variable rate fuel inlets.

23. A method of firing a tangential fired boiler comprising the steps of:

defining a combustion zone with a circumferential wall;

providing a plurality of fuel inlets disposed along the circumferential wall;

injecting fuel at non-uniform rates through the plurality of fuel inlets in order to produce localized fuel rich, oxygen poor zones and fuel lean, oxygen rich zones within the combustion zone, and to cause ambient boiler gases to be entrained into and mix with the oxygen poor zone to achieve fuel staging of the boiler;

wherein said providing a plurality of fuel inlets step comprises the step of providing a plurality of fuel inlets disposed substantially vertically along the circumferential wall; and wherein said injecting fuel step comprises the step of injecting fuel at a lowest rate with an uppermost fuel inlet, injecting fuel at a highest rate through a lowermost fuel inlet, and injecting fuel at intermediate rates along a gradient through fuel inlets located between the uppermost and lowermost fuel inlets such that a localized fuel rich, oxygen poor zone is created toward a bottom of the combustion zone and a fuel lean, oxygen rich zone is created toward a top of the combustion zone.

24. The method of claim 23 wherein said injecting fuel step comprises the step of injecting natural gas.

25. The method of claim 23 further comprising the step of injecting air through at least one overfire air inlet disposed vertically above the uppermost fuel inlet.

26. The method of claim 23 wherein the circumferential wall defining the combustion zone is generally rectangular when viewed along a generally horizontal cross-section.

27. A method of firing a tangential fired boiler comprising the steps of:

defining a combustion zone with a circumferential wall;

providing a plurality of fuel inlets disposed along the circumferential wall;

injecting fuel at non-uniform rates through the plurality of fuel inlets in order to produce localized fuel rich, oxygen poor zones and fuel lean, oxygen rich zones within the combustion zone, and to cause ambient boiler gases to be entrained into and mix with the oxygen poor zone to achieve fuel staging of the boiler;

wherein the circumferential wall defining the combustion zone is generally rectangular when viewed along a generally horizontal cross-section;

wherein said providing a plurality of fuel inlets step comprises the step of providing a first set of the plurality of fuel inlets disposed in two diagonally opposed corners of the circumferential wall and providing a second set of the plurality of fuel inlets disposed in the other two of the diagonally opposed corners of the circumferential wall; and wherein said injecting fuel step comprises the step of injecting fuel through the first set of fuel inlets at a higher rate than the second set of fuel inlets.

28. A method of firing a tangential fired boiler comprising the steps of:

defining a combustion zone with a circumferential wall;

providing a plurality of fuel inlets disposed along the circumferential wall;

injecting fuel at non-uniform rates through the plurality of fuel inlets in order to produce localized fuel rich, oxygen poor zones and fuel lean, oxygen rich zones within the combustion zone, and to cause ambient boiler gases to be entrained into and mix with the oxygen poor zone to achieve fuel staging of the boiler;

wherein the circumferential wall defining the combustion zone is generally rectangular when viewed along a generally horizontal cross-section;

creating a fireball disposed within the combustion zone by feeding fuel injected by the plurality of fuel inlets, the fireball rotating about an imaginary axis when viewed along a generally horizontal cross-section;

wherein said providing a plurality of fuel inlets step comprises the step of providing a plurality of fuel inlets disposed in each of the corners of the circumferential wall; and wherein said injecting fuel step comprises the step of injecting fuel through the fuel inlets comprising each set of the plurality of fuel inlets at non-uniform rates.

29. The method of claim 28:

wherein said providing a plurality of fuel inlets step comprises the step of providing a plurality of horizontally spaced apart fuel inlets disposed in each of the corners of the circumferential wall; and wherein said injecting fuel step comprises the step injecting fuel at a highest rate through the fuel inlet located most upstream with respect to rotation of the fireball, injecting fuel at a lowest rate through a fuel inlet located most downstream with respect to rotation of the fireball, and injecting fuel at intermediate rates along a gradient through fuel inlets located between the most upstream and most downstream fuel inlets such that a localized fuel rich, oxygen poor zone is created toward a center of the combustion zone and a fuel lean, oxygen rich zone is created toward a periphery of the combustion zone.

30. A tangential fired boiler comprising:

a circumferential wall defining a combustion zone, said circumferential wall being generally rectangular when viewed along a generally horizontal cross-section;

a first plurality of fuel inlets disposed substantially vertically along said circumferential wall, such that an uppermost fuel inlet injects fuel at a lowest rate, a lowermost fuel inlet injects fuel at a highest rate, and fuel inlets located between the uppermost and lowermost fuel inlets inject fuel at intermediate rates along a gradient such that a localized fuel rich, oxygen poor zone is created toward a bottom of the combustion zone and a fuel lean, oxygen rich zone is created toward a top of the combustion zone, and to cause ambient boiler gases to be entrained into and mix with the oxygen poor zone to achieve fuel staging of the boiler;

a second plurality of fuel inlets disposed along said circumferential wall, said second plurality of fuel inlets comprising a first set of fuel inlets disposed in two diagonally opposed corners of said circumferential wall and a second set of fuel inlets disposed in the other two of the diagonally opposed corners of said circumferential wall, wherein the first set of fuel inlets inject fuel at a higher rate than the second set of fuel inlets; and a third plurality of fuel inlets disposed along said circumferential wall, said third plurality of fuel inlets comprising a set of fuel inlets disposed in each of the corners of said circumferential wall, wherein the fuel inlets comprising each set of said third plurality of fuel inlets inject fuel at non-uniform rates.

* * * * *